Patented Mar. 1, 1938

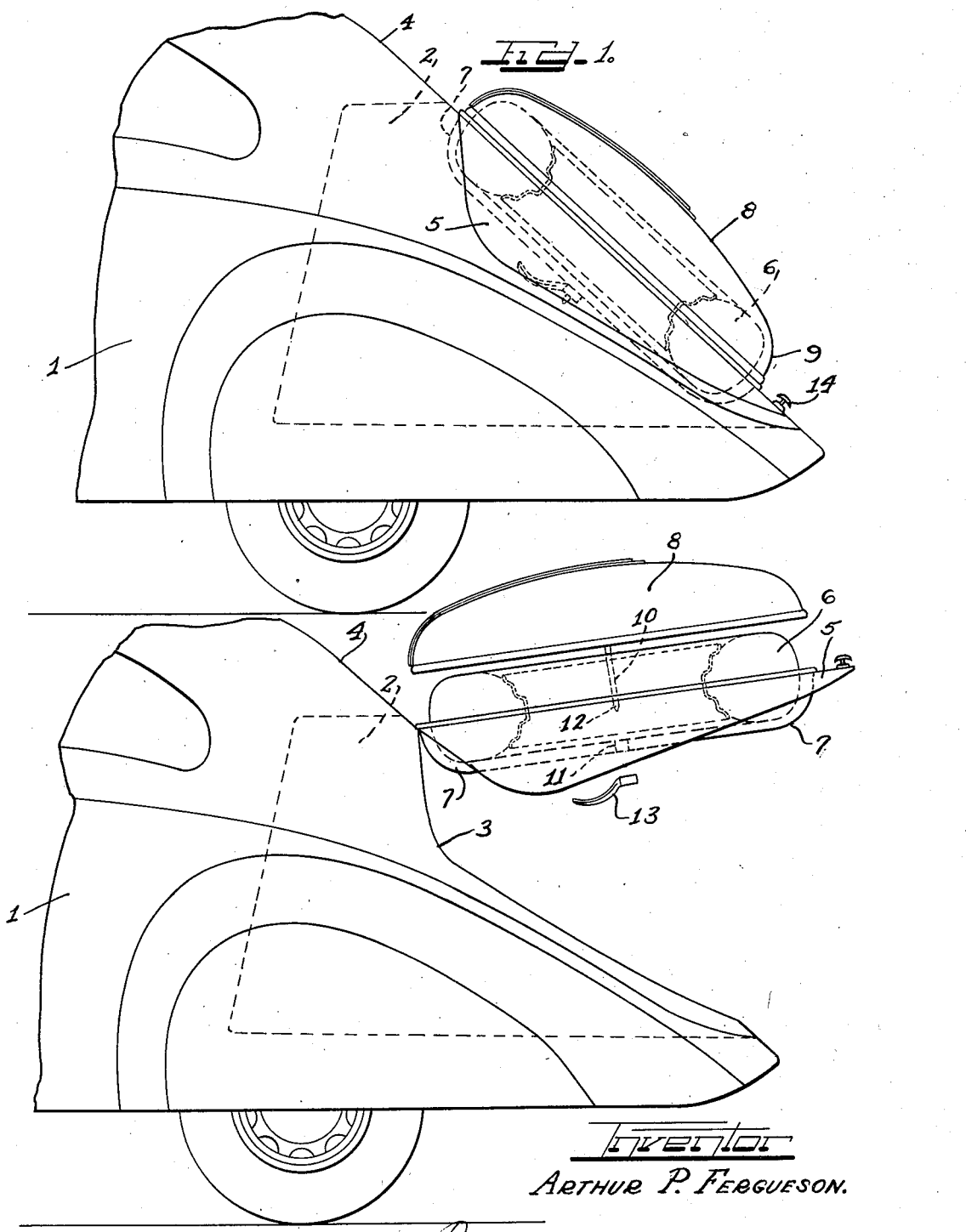

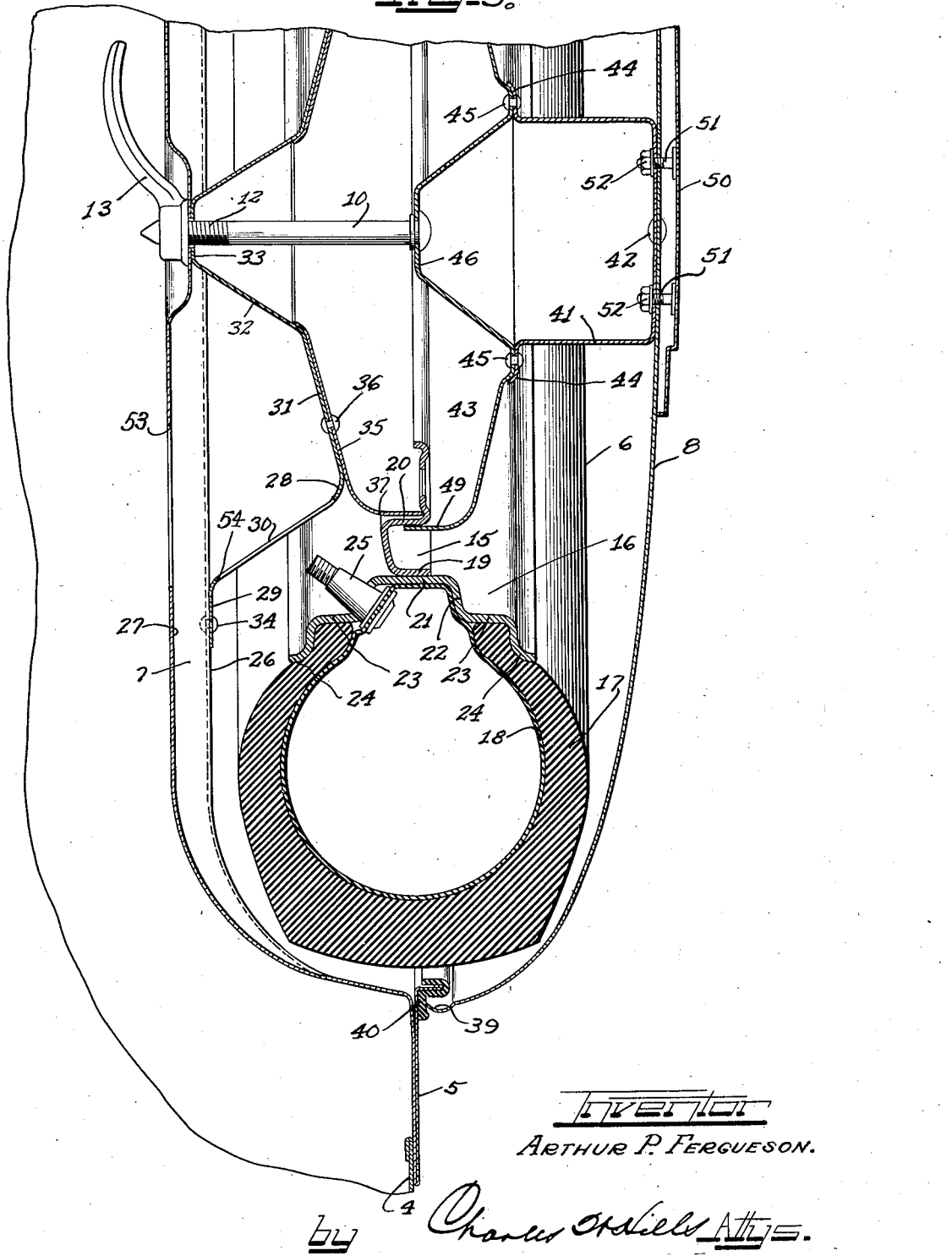

2,109,665

UNITED STATES PATENT OFFICE 2,109,665

SPARE WHEEL ASSEMBLY

Arthur P. Fergueson, Detroit, Mich., assignor, by mesne assignments, to Houdaille-Hershey Corporation, Detroit, Mich., a corporation of Michigan Application August 24, 1936, Serial No. 97,524

3 Claims. (Cl. 296—37)

This invention relates to spare wheel assemblies, and more particularly to a vehicle body construction of the type having a compartment accessible from the exterior and a closure member therefor, the spare wheel of the vehicle being detachably mounted on the exterior side of the closure member.

Spare wheel assemblies in the past have assumed a wide variety of forms. Especially in the automotive industry every effort has been made to provide an assembly which will minimize the encroachment of valuable space in the vehicle, and which will enhance the general appearance of the vehicle. Now it is an object of this invention to provide a novel spare wheel assembly which achieves the above highly desirable results.

At the present time passenger vehicles are frequently provided with a luggage compartment which is accessible from the exterior of the vehicle. The compartments usually are provided with relatively large openings which are adapted to be covered by complementary closure members. It is one of the objects of this invention to provide a novel spare wheel assembly which is carried on such a closure member.

It is a further object of this invention to provide a novel construction for assembling a spare wheel and a spare wheel cover on a vehicle.

It is a still further object of this invention to provide a novel means for preventing unauthorized removal of a spare wheel from a vehicle.

It is a still further object of this invention to provide a novel means for supporting and securing a spare wheel and a spare wheel cover on a vehicle.

It is a still further object of this invention to provide a novel spare wheel assembly which utilizes the locking mechanism of a vehicle compartment closure member to prevent unauthorized removal of the spare wheel.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings in which:

Figure 1 is a side elevational view illustrating one embodiment of my novel spare wheel assembly as mounted on the rear end of a passenger vehicle;

Figure 2 is a side elevational view of the rear end of the passenger vehicle shown in Figure 1 but with the closure member of the vehicle compartment in its open position and the various component parts of the spare wheel assembly in an exploded position; and Figure 3 is an elevational view partly in cross section of the lower half of the spare wheel assembly.

Referring now to Figures 1 and 2 of the drawings, the passenger vehicle illustrated conventionally therein includes a body 1 having a rear compartment or luggage space 2 which is accessible through a relatively large opening 3 in the rear wall 4 of the vehicle. Aperture 3 is normally closed by a closure member 5. The closure member 5 may be secured in any desired manner to the vehicle body but preferably it is pivotally mounted by any suitable means (not shown) to rear wall 4 at points in close proximity to the upper edge of aperture 3.

In accordance with the teachings of my invention, a spare wheel 6 is adapted to be supported and carried on the exterior side of closure member 5. For this purpose, member 5 is provided with a recessed central portion 7. Recess 7 may have any suitable dimensions, but preferably its depth dimension is equal approximately to half the width of the wheel 6 and its width dimension is slightly greater than the diameter of wheel 6. These dimensions permit spare wheel 6 to be nested in the recessed central portion 7 in a manner which will presently be described.

Disposed over the outer side surface of spare wheel 6 is an ornamental cover member 8. This cover member may be provided with any desired configuration but preferably the outer marginal portion 9 of cover member 8 extends around the peripheral edge of spare wheel 6 into contact with closure member 5. Cover member 8 is provided with a cover securing element 10 such for example as an elongated stud or bolt which extends centrally through spare wheel 6 and through a suitable aperture 11 in closure member 5. The outer free end 12 of securing element 10 is adapted to receive and engage a clamping element 13 such for example as a handle which is provided with a screw threaded aperture which is adapted to engage the screw threaded end of securing element 10.

Closure member 5, in a manner which is well known to those skilled in the art, is held in its closed position by a plurality of combination latch and locking mechanisms which are illustrated in the drawings conventionally by handles 14. It will thus readily be understood that access to clamping element 13 cannot be had without first unlocking latching member 14 and raising closure member 5.

Referring now to Figure 3 of the drawings the structural details of the preferred embodiment of my invention will be described. As may be seen in the drawings spare wheel 6 includes a wheel body part 15, a drop-center rim 16, a pneumatic tire 17, and an inner tube 18. Body part 15 of spare wheel 6 includes an axially extending outer flange 19 and an axially extending intermediate flange 20. Drop-center rim 16 includes a base flange 21, opposite side flanges 22, opposite intermediate flanges 23, and opposite edge portions 24. Base flange 21 of rim 16 is adapted to be secured to axially extending flange 19 of body part 15 in any suitable manner such as by welding or riveting (not shown).

Spare wheel 6 is mounted on a carrier means which is disposed within the recessed central portion 7 of closure member 5. In order to obtain the requisite structural strength of member 5 which will permit the mounting of a spare wheel thereon, the recessed central portion 7 is shown with a plurality of alternate ridge portions 26 and channel portions 27. It will, of course, be understood that the particular manner of reinforcing the closure member 5 forms no part of this invention, and any other suitable means may be employed for this purpose without departing from the spirit and scope of my invention.

One form of structural design for the spare wheel carrier which has been found to give highly satisfactory results includes a member 28 which extends first radially inwardly from its outer marginal edge 29, then approximately axially outwardly in a well portion 30, then approximately radially inwardly as at 31, then approximately axially inwardly as at 32, and finally radially inwardly to the center as at 33. Member 28 is secured to the recessed central portion 7 of closure member 5 at its outer marginal edge 29 by a plurality of rivets 34 or in any other suitable manner. Center portion 33 of member 28 is disposed within one of the channel portions 27 of closure member 5. Riveted or otherwise suitably secured as at 36 to portion 31 of member 28 is a drum-like mounting member 35. Drum-like member 35 is adapted to lie in intimate contact with portion 31 of member 28 and it is also provided at its outer marginal edge with axially extending flange 37. As may be seen from the drawings flange 37 is adapted to be nested inside of flange 20 of wheel 6 when the wheel is moved axially into engagement therewith. Flange 37 thus forms the sole supporting means for spare wheel 6.

Disposed over the outer side surface and extending partly around the outer peripheral edge of spare wheel 6 is a cover member 8. The outer marginal edge 39 of cover member 8 is adapted to engage and slightly compress a cushioning bead 40 which is secured in any suitable manner to closure member 5 in proximity to the central recessed portion 7 thereof. As will readily be understood by those skilled in the art cushioning bead 40 prevents the cover member 8 from rattling when the vehicle upon which the spare wheel assembly is associated is in motion. Centrally secured on the inner side of cover member 38 is a hat-shape member 41. Member 41 may be secured to the cover member in any suitable manner such as by a rivet 42 or by welding (not shown). A drum-like cover mounting member 43 is riveted to the outer radially extending flange 44 of member 41 as indicated at 45. Drum-like member 43 has a depressed central portion 46 from which extends an elongated bolt 10. Elongated bolt 10 is threaded at its outer end 12 for a purpose which will presently be explained.

Drum-like member 43 includes an axially extending flange 49 at its outer marginal edge. Flange 49 is so dimensioned as to snugly fit over the outer surface of flange 20 of wheel 6 as may be seen in the drawings. Cover member 38 is thus centered and supported by the engagement of flange 49 with wheel flange 20.

In order to slightly reinforce the structure of the cover member and in order to further enhance the beauty thereof a rib 50 is provided on cover member 8 which extends from the top of the latter to a point slightly below the middle. The upper part of rib 50 may be secured to the cover in any suitable manner (not shown) and the lower end of rib 50 may be secured to the cover by means of a plurality of bolts 51 which are welded to the underside of rib 50 and which extend through cover member 8 into engagement with cooperating nuts 52.

It will be observed upon inspection of the drawings that although cover member 8 is mounted on wheel 6, it is secured in place by means of the elongated bolt 10 which extends centrally through wheel 6 and through the recessed central portion 7 of closure member 5 into detachable engagement with a clamping element or handle nut 13. Furthermore, inasmuch as the cover member 8 engages the outer side of spare wheel 6 the clamping means just referred to also serve to secure and hold the wheel in place on its respective mounting means. It thus will readily be appreciated that the need for carrier wheel bolts and nuts or similar spare wheel securing devices have been entirely eliminated.

In order to permit access to valve 25, openings 53 and 54 are provided in closure member 5 and in member 28 respectively opposite valve 25. These openings not only permit ready access to valve 25 without removing the spare wheel from its support, but also prevents unauthorized deflation of the tire when member 5 is in its closed and locked position.

The manner of assembling and disassembling the spare wheel assembly will now be described. Assuming that the various elements of the spare wheel assembly are in their relative positions as shown in Figures 1 and 3 of the drawings, in order to remove spare wheel 6 and cover member 38 it is first necessary to unlock the latching mechanism 14 of closure member 5. Closure member 5 is then raised into position shown in Figure 2 and handle nut 13 is unscrewed from the threaded end 12 of elongated bolt 10. Closure member 5 is then lowered to its original position and cover member 38 and spare wheel 6 may then readily and quickly be removed since there is no longer any clamping means which secures them in place.

To reassemble and secure spare wheel 6 and cover member 8 on closure member 5 wheel 6 is first moved in an axial direction until drum-like member 35 is nested against the inner surface of intermediate flange 20 of wheel 6. Cover member 8 is then moved in an axial direction until drum-like member 43 engages the outer edge of flange 20 and until the elongated bolt 10 extends through the recessed central portion 7 of closure member 5. Member 5 is then raised to an approximately horizontal position and handle nut 13 is screwed on the end 12 of bolt 10. Closure member 5 is then lowered into its closed position and latching mechanism 14 is locked. Spare wheel 6 and cover member 8 cannot again be removed until an authorized person has unlocked latching mechanism 14 and again lifted up member 5.

From the above description it is apparent that I have provided an extremely simple spare wheel assembly which is economical to manufacture and which is rugged and reliable in use. Duplication of locking mechanism is avoided since a common locking mechanism may be used for both the closure member of the automobile compartment and for the spare wheel assembly. The structure which I have described has also entirely eliminated the need for carrier wheel bolts and nuts to secure the spare wheel on the vehicle. This affords a much more rapid removal and assembly of the spare wheel and spare wheel cover on the vehicle, a feature which obviously has high commercial value. It will also be observed from the above description that I have minimized the encroachment of valuable space in the vehicle by disposing the spare wheel assembly on the closure member of a vehicle compartment.

While I have shown a particular embodiment of my invention, it will of course be understood that I do not wish to be limited thereto since many modifications may be made, and I therefore contemplate by the appended claims to cover all such modifications as fall within the true scope of my invention.

I claim as my invention:

1. With a vehicle body having a compartment therein accessible from the exterior through an aperture in said body, the combination comprising a closure member for said aperture having a recessed central portion on the outer side thereof, a spare wheel detachably mounted on said closure member within said recessed central portion, a wheel cover disposed over the outer side surface of said wheel, and detachable means for securing said cover to said closure member, said detachable means being accessible only when said closure member is in an open position.

2. In a vehicle body construction having a pivotally mounted body wall section, the combination with said section of a spare wheel having an intermediate axially extending annular flange, said wall section having a drum-like wheel supporting member adapted to engage telescopically said flange to support said wheel, an ornamental wheel cover having a drum-like cover supporting member adapted to engage telescopically the opposite side of said flange from that engaged by said wheel supporting member, and means accessible only from the interior side of said wall section for securing said cover thereto.

3. In a vehicle body construction having a pivotally mounted body wall section which is adapted to be locked in its normally closed position, the combination with said section of a spare wheel having an intermediate axially extending annular flange, said wall section having a drum-like wheel supporting member adapted to engage telescopically said flange to support said wheel, an ornamental wheel cover having a drum-like cover supporting member adapted to engage telescopically said flange, and means accessible only from the interior side of said wall section for securing said cover thereto, whereby unauthorized removal of said cover and said wheel is prevented.

ARTHUR P. FERGUESON.